(12) United States Patent
Moss et al.

(10) Patent No.: US 7,895,982 B2
(45) Date of Patent: Mar. 1, 2011

(54) REFURBISHED CAMSHAFT AND METHOD

(75) Inventors: Jarrod David Moss, Washington, IL (US); Adam Ostein, Chillicothe, IL (US); Curtis Graham, Peoria, IL (US); Patrick W. Savage, Jr., Chillicothe, IL (US); Trent A. Simpson, Peoria, IL (US); Benjamin C. Thomas, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 441 days.

(21) Appl. No.: 11/958,762

(22) Filed: Dec. 18, 2007

(65) Prior Publication Data

US 2009/0151140 A1    Jun. 18, 2009

(51) Int. Cl.
  *F01L 1/04* (2006.01)
(52) U.S. Cl. .................. 123/90.6; 74/567; 29/888.1
(58) Field of Classification Search ............. 123/90.6; 74/567; 29/888.1
  See application file for complete search history.

(56) References Cited

U.S. PATENT DOCUMENTS

| | | | |
|---|---|---|---|
| 2,552,724 A | 5/1951 | Lang | |
| 3,740,829 A | 6/1973 | Yarger | |
| 4,638,683 A | 1/1987 | Ogawa et al. | |
| 4,936,005 A | 6/1990 | Dziurowitz | |
| 6,182,627 B1 | 2/2001 | Matthews | |
| 6,314,643 B1 | 11/2001 | Leith | |
| 6,591,713 B2 | 7/2003 | Jesel | |
| 6,725,818 B2 | 4/2004 | Methley | |
| 2002/0020371 A1* | 2/2002 | Jesel | ............... 123/90.6 |
| 2007/0039411 A1 | 2/2007 | Lechner et al. | |
| 2007/0144468 A1 | 6/2007 | Takeshima et al. | |

FOREIGN PATENT DOCUMENTS

FR    2709524 A1 *    3/1995

\* cited by examiner

*Primary Examiner*—Zelalem Eshete

(57) ABSTRACT

A method of refurbishing a camshaft (100) having at least one defective portion (202, 206) includes removing material from the at least one defective portion (202, 206) to create a neck region (302). An alignment feature (402) is introduced in the neck region (302) according to a previous orientation of the defective portion (202, 206). A blank (508) is installed around the neck region (302) and oriented with the alignment feature (402).

7 Claims, 5 Drawing Sheets

REFURBISHED CAMSHAFT AND METHOD

TECHNICAL FIELD

This patent disclosure relates generally to rotating eccentric shafts for use in internal combustion engines and, more particularly, to refurbished or repaired camshafts having had worn or damaged lobes.

BACKGROUND

Rotating shafts having eccentric features formed on portions of their outer surfaces are commonly used in various machines requiring cyclically timed mechanical events or actuations of various components. For example, an internal combustion engine may use a rotating camshaft for timed actuation of intake or exhaust valves controlling the flow of air and exhaust into and out from one or more combustion chambers. Camshafts are typically unitary structures having lobes or eccentric features protruding therefrom. The lobes are arranged to periodically push onto a roller or follower connected to another engine component, where the roller or follower tracks an outer periphery or race of each lobe.

In a typical camshaft application, each lobe is continuously in contact with a roller or follower. The interface between the cam lobe and follower is continuously subject to compressive forces and friction, causing wear and/or damage to the lobe during prolonged use, or when a defective condition is present. For example, in instances where inadequate lubrication of the interface is provided and/or situations when the follower is not properly aligned with its respective lobe, wear and/or damage to the lobe may occur. A damaged lobe may directly affect the motion of the follower and, hence, operation of the engine.

SUMMARY

The disclosure describes, in one aspect, a method of refurbishing a camshaft having at least one defective lobe. The method includes removing material from the at least one defective lobe to create a neck region. An alignment feature is introduced in the neck region indicative of a previous orientation of the defective lobe. A lobe blank is installed around the neck region and oriented with respect to the alignment feature. The lobe blank is refined to match a lobe profile of the defective lobe.

In another aspect, the disclosure describes a refurbished camshaft. The refurbished camshaft includes a camshaft core having a centerline. The neck region and at least one alignment feature are formed at an axial location on the camshaft core. A lobe blank having a neck opening surrounds the neck region. Proper orientation of the lobe blank is accomplished by the alignment feature formed in the neck region. The lobe blank includes at least two portions connected to each other to form a rigid structure around the neck region. In an alternate embodiment, the refurbished camshaft includes at least two portions that are connected to each other via the lobe blank, which is a single piece, to form a rigid structure.

DETAILED DESCRIPTION

This disclosure relates to camshafts for use with internal combustion engines. The disclosure provides various embodiments for the apparatus and methods associated with reworking or refurbishing a camshaft having a worn or damaged lobe in a remanufacturing facility, to avoid scrapping the returned camshaft in favor of a new one. The camshaft described herein is configured for use in actuating fuel injectors for a unit injection system. The devices and methods described and used herein, nevertheless, have broad applicability not only to camshafts used to operate other systems on an internal combustion engine, but also to different applications for camshafts in general, for example, camshafts operating valves in reciprocating pumps, and so forth.

Figure 1:
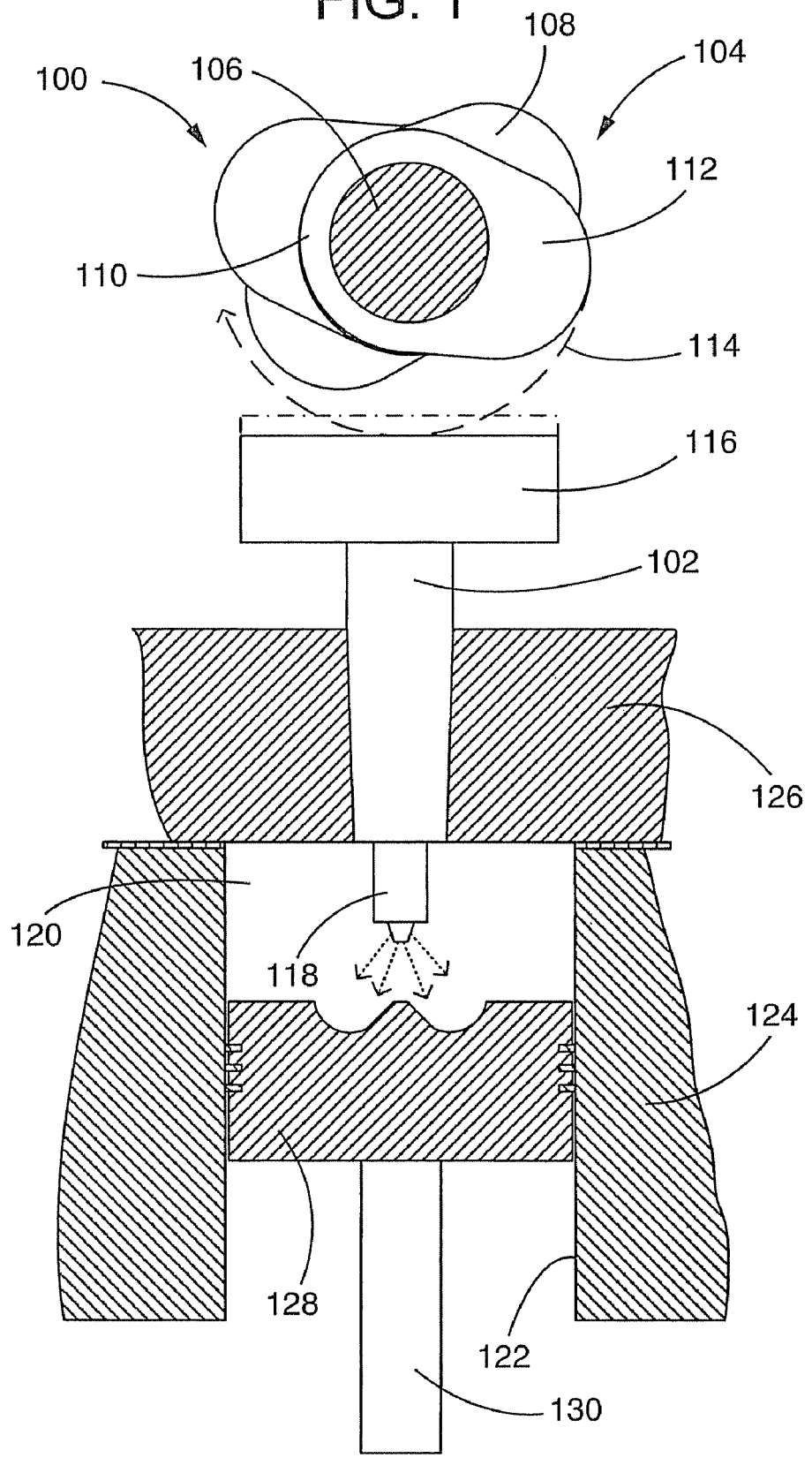
FIG. 1 is a partial cross section of a camshaft installed in an internal combustion engine in accordance with the disclosure.

FIG. 1 is a partial section view of a camshaft 100 used to operate a unit fuel injector 102 installed on an internal combustion engine 104. The camshaft 100 includes a central shaft portion or camshaft core 106, which typically has a circular cross section, and a plurality of lobes 108 successively positioned along the camshaft core 106. Each lobe 108 has a base portion 110, which is typically circular in cross section and surrounds the camshaft core 106, and an actuator portion 112, which extends eccentrically from the base portion 110 and which follows a path 114 as the camshaft 100 rotates.

In this exemplary application the camshaft 100 is arranged for operating the injector 102, and other injectors, by cyclically actuating a plunger 116 of the injector 102. The injector 102, being a unit injector, is capable of compressing fuel by motion of the plunger 116, which acts as a reciprocating piston pump within the injector 102. As the camshaft 100 rotates and the actuator portion 112 of the lobe 108 follows the path 114, the lobe 108 comes into contact with the plunger 116, pushing it in a compressing direction. Fuel compressed within the injector 102 by motion of the plunger 116 exits the injector 102, typically as a mist, via a plurality of openings formed in a nozzle portion 118 of the injector 102.

The nozzle portion 118 of the injector 102 is located within a combustion cylinder 120 of the engine 104. The combustion cylinder 120 has a variable volume defined between a bore 122 formed in a crankcase 124 of the engine 104, a cylinder head 126, and a reciprocating piston 128 located within the bore 122. During operation of the engine 104, air and fuel are compressed within the combustion cylinder 120 and ignited, pushing the piston 128 and generating work. Work is transferred from the piston 128 to a crankshaft (not shown) via a connecting rod 130, thus generating power while the engine 104 operates.

Figure 2:
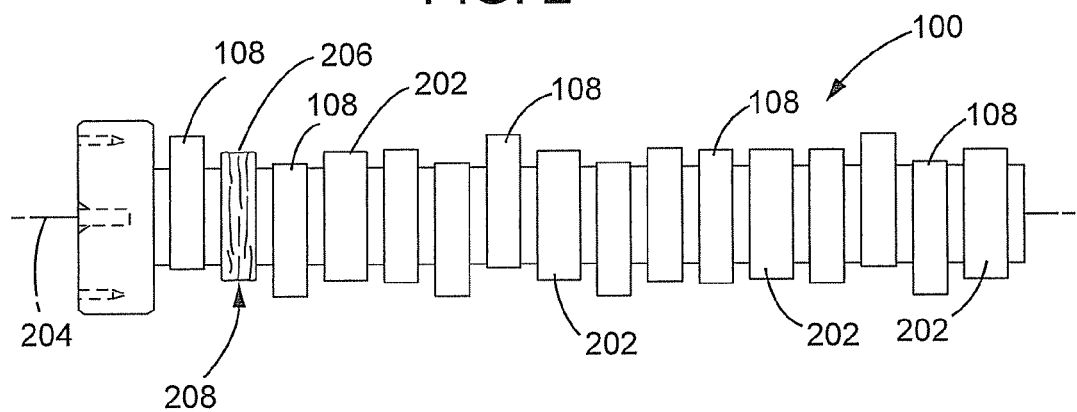
FIG. 2 is a side view of a camshaft having a damaged lobe in accordance with the disclosure.

FIG. 2 is a side view of the camshaft 100. As shown here, the camshaft 100 is arranged to operate an engine having four cylinders, each cylinder associated with three lobes 108 that operate, respectively, the intake valves, exhaust valves, and injector associated with each cylinder. Each lobe 108 has a different orientation or phase shift with respect to adjacent lobes 108. The lobes 108 are arranged in sets of three with bearing portions 202 occupying the space between each set. While the lobes 108 are eccentric, the bearing portions 202 are cylindrical and concentric with a centerline 204 of the camshaft 100. The bearing portions 202 are used to provide support along various locations along the centerline 204 when the camshaft 100 is installed into an engine.

Wear or damage to the lobes 108 and/or bearing portions 202 may occur in situations when inadequate lubrication, misalignment, or another failure occurs that affects the working interface between each lobe 108 and another component of the engine 104, for example, the plunger 116 shown in FIG. 1 or, in general, any follower component contacting the lobe. Such conditions can cause excessive wear or scuffing of one or more of the lobes 108 or bearing portions 202, which can lead to replacement and scrapping of the camshaft 100. For illustration, a defective lobe 206 is shown in FIG. 2 having scuff marks or scratches 208 formed thereon, but other lobes 108 or bearing portions 202 may be damaged. Up to now, the camshaft 100 having the defective lobe 206 or bearing portion 202 would have been scrapped and replaced with a new one because repair or reconditioning was deficient if not impossible. The camshaft 100, however, may advantageously be rebuilt or reconditioned as described below.

When the camshaft 100, or others having similar failures, are returned to a remanufacturing facility, they may first be inspected to determine conformance with dimensional specifications. For example, some camshafts may fail this inspection because their centerlines 204 are skewed from their desired linearity. In such situations, these camshafts will fail in the same or a similar fashion even if a defective lobe or bearing is replaced, and are either scrapped or undergo a process to restore the linearity of their centerlines. In cases, however, when the only defect is the defective lobe 206 or bearing portion 202, then the camshaft 100 may progresses on to be reworked and have the defective lobe 206 or bearing portion 202 replaced with a new one.

Figure 3:
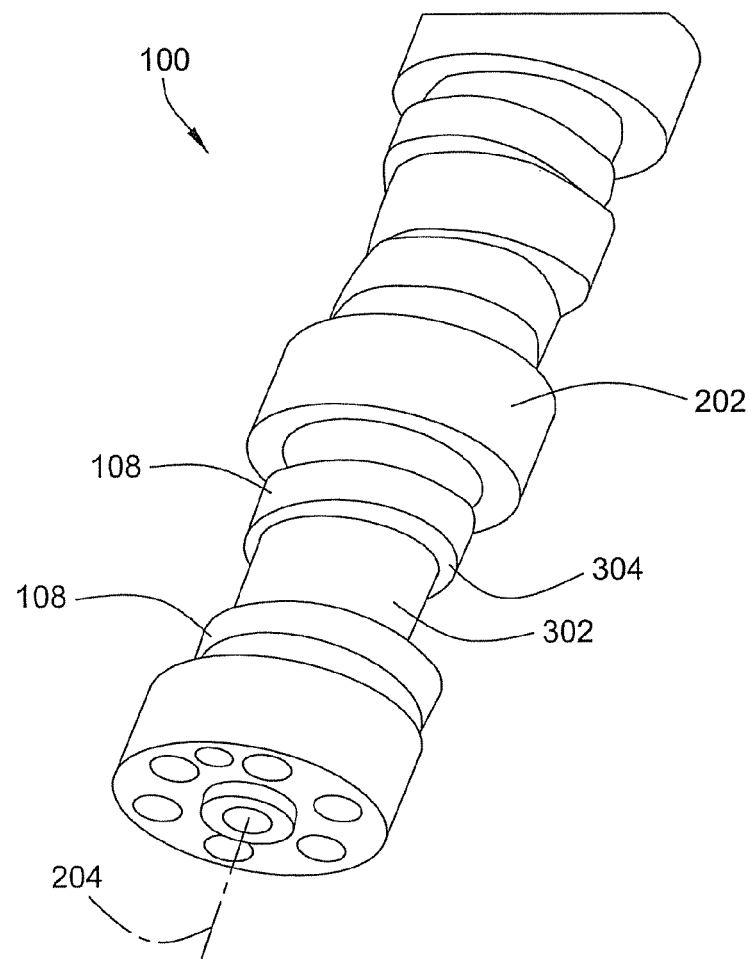
FIG. 3 is a partial outline view of a camshaft having a neck region resulting from the removal of a damaged lobe in accordance with the disclosure.

The rebuilding process may begin with a grinding or machining operation to remove the defective lobe 206. As shown in the partial view of FIG. 3, the defective lobe 206 is ground down at least partially or, in this case entirely, leaving a neck region 302 in its place. The neck region 302 may be formed, for example, by turning the camshaft 100 on a lathe or subjecting the camshaft 100 to a single or multi axial machining process. When a lathe is used, the neck region 302 may have a cylindrical shape and be concentric with the centerline 204 of the camshaft 100. As can be appreciated, more than one defective lobe 206 may be ground at the same time. Optionally, the neck region 302 may be ground to have an outer diameter that is smaller than a diameter of the camshaft core 106 of the camshaft 100 to create a shoulder 304 on either side of the neck region 302 along the centerline 204. If a shoulder 304 is not deemed necessary, the neck region 302 may be formed with either a larger or smaller diameter than the diameter of the camshaft core 106.

After the neck region 302 has been defined, the camshaft 100 may be oriented in a fixture and a key or alignment feature 402 may be formed in the neck region 302. The alignment feature 402, in this case, is a flat portion 404 formed in the neck region 302 by cutting away material from the camshaft core 106. Orientation of the flat portion 404 with respect to the remaining lobes 108 of the camshaft 100 is important because the flat portion 404 will be used to orient a replacement lobe in a subsequent process. As can be appreciated, the alignment feature 402 may take on many different forms depending on the design selected and is not limited to one or more flat portions being formed in the neck region 302.

Figure 4:
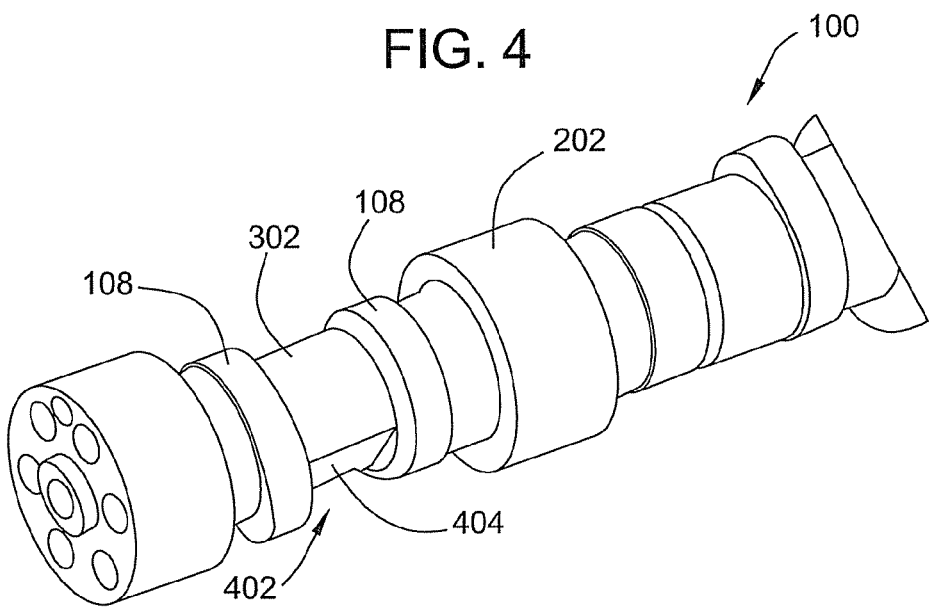
FIG. 4 is a partial outline view of an alignment feature formed in the neck region of a camshaft in accordance with the disclosure.
Figure 5:
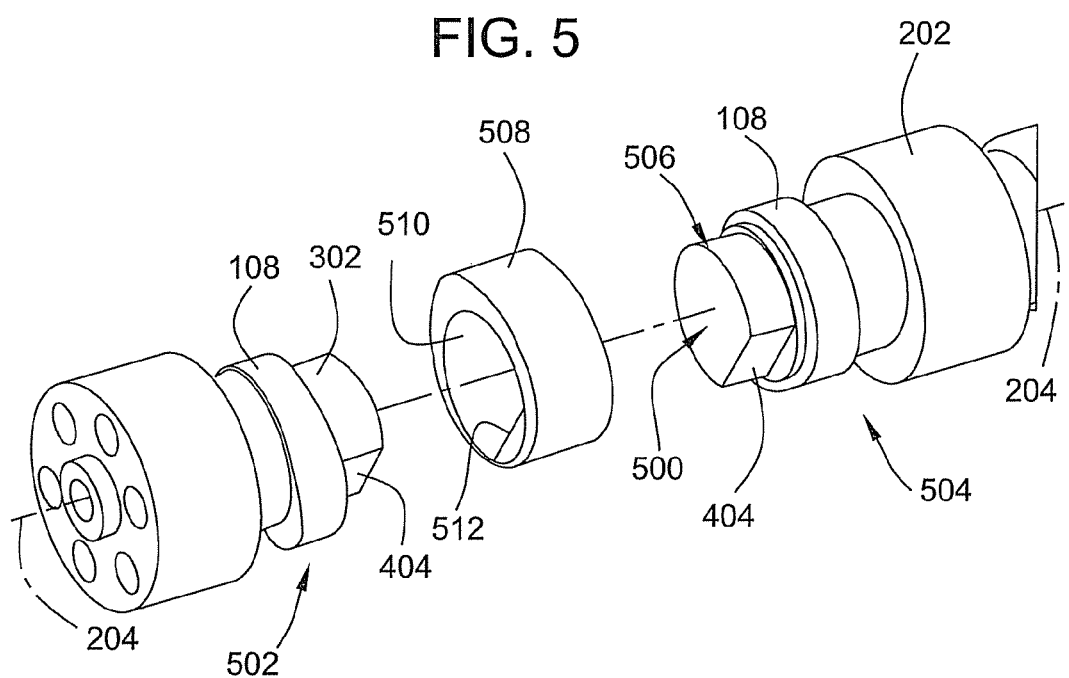
FIG. 5 is a breakaway view of a segmented camshaft during installation of a lobe blank in accordance with the disclosure.
Figure 6:
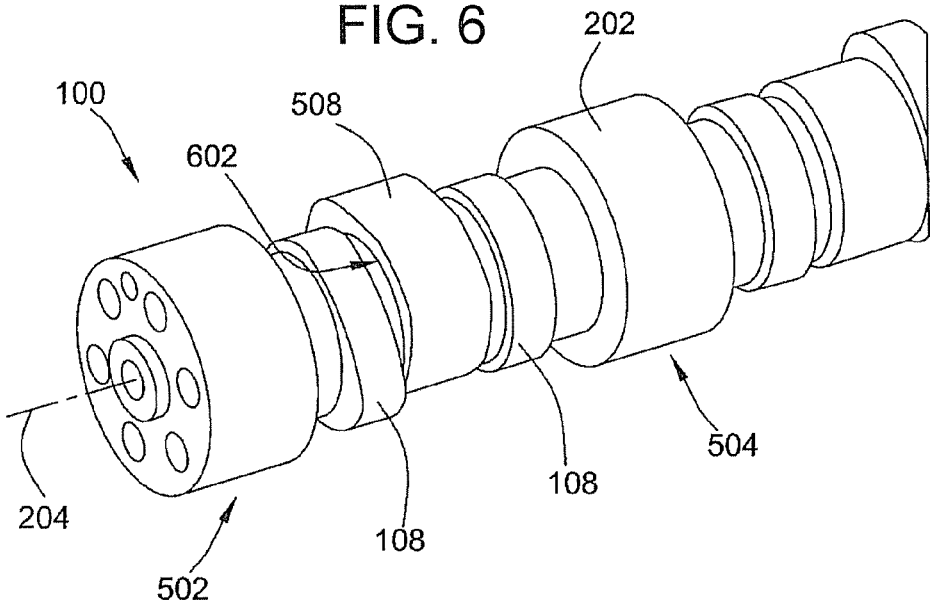
FIG. 6 is an assembled view of a segmented camshaft having a lobe blank installed onto the neck region in accordance with the disclosure.

The camshaft 100 in the state shown in FIG. 4 is ready to receive a replacement lobe or bearing portion blank. As shown, the camshaft 100 is adapted to receive a lobe blank, but the processes and methods disclosed herein are equally adaptable for replacement of a bearing portion. Two embodiments are disclosed herein for connecting a replacement lobe to the camshaft 100 having the neck region 302 and flat portion 404 formed thereon. The description will be focused on replacement of a lobe, which requires a more precise alignment to the camshaft 100, but the methods can easily be adapted for a bearing blank. In the first embodiment, the camshaft 100 is cut along a surface 500 as shown in FIG. 5. The cut, which can be performed after an alignment feature has been formed in the neck region 302, separates the camshaft 100 into a first and second portions 502 and 504 at a cut location 506 along the centerline 204. Each of the first and second portions 502 and 504 advantageously retains at least a portion of the alignment feature or flat portion 404 thereon to aid in proper re-assembly of the camshaft 100. The surface 500 shown in FIG. 5 is planar and intersects the centerline 204 perpendicularly. Of course, the surface 500 may be non planar, or may even intersect the centerline 204 at a different angle to facilitate alignment during re-assembly of the first and second portions 502 and 504. Moreover, dowel holes or other alignment features may be formed in the neck region or surface 500 to facilitate re-assembly of the camshaft 100.

After the first portion 502 has been separated from the second portion 504, a lobe blank 508 having a neck opening 510 may be inserted over the neck region 302 between the first portion 502 and second portion 504. The neck opening 510 may be circular and have an internal diameter forming a clearance fit with the outer diameter of the neck region 302. In the configuration illustrated where the neck region 302 has a flat portion 404, the lobe blank 508 may have a ledge 512 formed on one side of the neck opening 510 that fits over the flat portion 404 to align the lobe blank 508 with respect to the remaining lobes 108 and also to align the first portion 502 with the second portion 504 of the camshaft 100. Alternatively, the fit between the neck opening 510 and the neck region 302 may be an interference fit requiring a press-fit operation to push the first portion 502 and second portion 504 together and within the lobe blank 508.

After the lobe blank 508 has been installed and the first portion 502 has been pushed together with the second portion 504, the camshaft 100 may be inspected for linearity of the centerline 204 and for its total length before being permanently connected, for example, by welding the lobe blank 508 into place along two seams 602 (only one visible) to create a rigid structure. As can be appreciated, this permanent connection can be used to fuse the lobe blank 508 with each of the first portion 502 and second portion 504 to yield a unitary structure. Alternative methods of connecting the first and second portions 502 and 504 with the lobe blank 508 include press-fitting, brazing, use of adhesives, and so forth.

In a final and optional operation, the shape of the lobe blank 508 may be refined to match a desired lobe profile. In cases, for example, where more than one type of camshafts are reconditioned in the same facility, a single lobe blank piece may be used to repair any defective camshafts. Moreover, lobe blanks may be used to replace bearing portions of the camshaft. In this case, the blank would be refined to remove any eccentricity to yield a cylindrical bearing portion. In the case of lobe replacement, because different camshafts may be processes in a single facility and each of the camshafts may have different lobe shapes, the lobe blanks may be shaped in a machining or grinding operation to achieve the desired contour.

Figure 7:
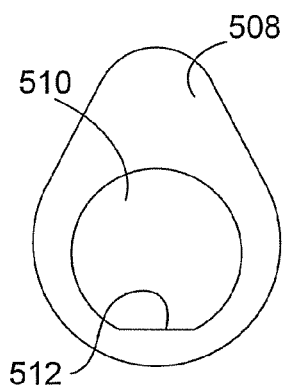
FIGS. 7-9A are alternative embodiments of lobe blanks having various alignment features in accordance with the disclosure.
Figure 8:
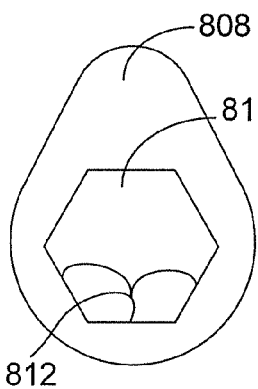
Figure 9:
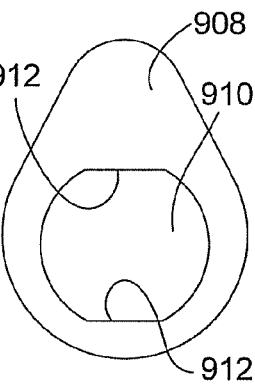

Three different embodiments of lobe blanks are shown in FIGS. 7 through 9. These lobe blanks may also be used to replace bearing portions or, alternatively, bearing blanks that are generally cylindrical may be used. In FIG. 7, the lobe blank 508 described thus far is presented. As stated previously, the lobe blank 508 has a neck opening 510 that defines a flat spot or ledge 512. The ledge 512 helps not only to align the lobe blank 508 with respect to the camshaft 100, but is also useful in aiding the lobe blank 508 to withstand torsional loading during operation. A second embodiment for a lobe blank 808 is shown in FIG. 8. The lobe blank 808 also has a neck opening 810 but, in this case, the neck opening 810 is surrounded by a hexagonal key feature having six symmetrically arranged sides 812. In this case, the neck region of a corresponding camshaft would have a hexagonal shape corresponding to the shape of the neck opening 810. It can be appreciated that a shape such as this, even if more difficult to manufacture, is better suited to withstand torsional loading tending to shear the interface between the lobe or bearing blank and the neck region of the camshaft.

A third embodiment for a lobe blank 908 is shown in FIG. 9. In this embodiment, a neck opening 910 of the lobe blank 908 has two opposing flat spots or ledges 912 formed around the neck opening 910. This arrangement is easier to manufacture than the second embodiment shown in FIG. 8, and is more effective in dealing with torsional stresses causing shear along the interface between the lobe blank and the neck region than the first embodiment shown in FIG. 7.

Figure 9A:
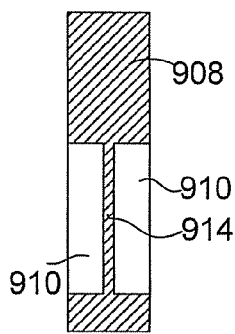

A cross section of a variation on the third embodiment for a lobe blank is shown in FIG. 9A. This variation includes an optional spacer 914 disposed within neck opening 910. The spacer 914, which may be formed unitarily or added as a separate piece with not just the lobe blank 908 but with any of the lobe blanks described in this disclosure, can be used to correct the overall length of the camshaft 100. As can be appreciated, some material from the neck region 302 may be lost when the camshaft 100 is cut. For example, if the camshaft 100 is cut using a band saw, a segment of material corresponding to a length of the camshaft 100 that is about equal to the thickness of the cutting blade on the band saw will be lost during the cut. The spacer 914 can advantageously restore the material lost during cutting of the camshaft 100 and bring the overall length of the re-assembled camshaft 100 close to its original length. Of course, the spacer 914 can also be used when replacing a bearing portion of the camshaft 100.

The different configurations for key features presented thus far are not deemed exhaustive and are used simply for illustration. Other configurations are possible and considered to be within the scope of the present disclosure. One similarity between the embodiments for lobe blanks presented in FIGS. 7-9 is that each lobe blank is made from a single piece of material, typically metal or ceramic, that fully surrounds the neck opening. Therefore, installation of such lobe blanks requires cutting of the camshaft at the neck region, as described, installation of the lobe blank, and then re-assembly and alignment of each camshaft portion to yield a reconditioned camshaft.

In an alternate method, the lobe or bearing blank may be segmented instead of the camshaft to avoid the processes of re-assembling and re-aligning the portions of the camshaft. This alterative embodiment is similar to the embodiment described above up to the point when the camshaft 100 is brought to the state described and shown in FIG. 4, namely, after the defective lobe 206 or bearing portion 202 of the camshaft 100 is removed and the neck region 302 and flat portion 404 are formed. Following this operation, a segmented lobe blank 1008 is inserted directly over the neck region 302 instead of cutting the camshaft 100. The description below relates to a replacement lobe for illustration of the process used for reconditioning the camshaft, but is equally applicable to replacement of a bearing blank.

Figure 10:
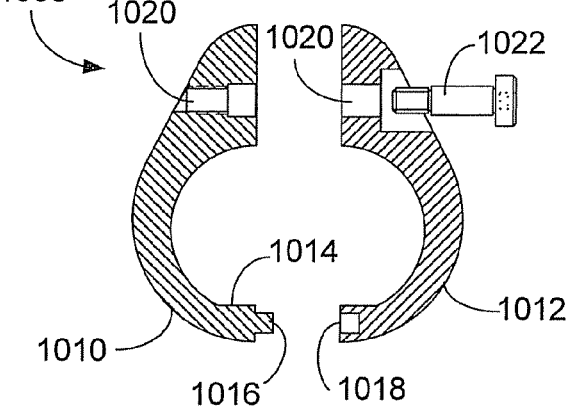
FIGS. 10-13 are alternative embodiments of segmented lobe blanks having various connection configurations and various alignment features in accordance with the disclosure.
Figure 11:
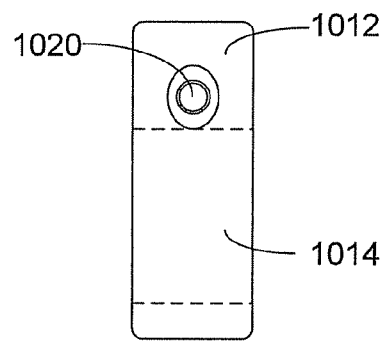

One example of a segmented lobe blank 1008 is shown in FIGS. 10 and 11. The segmented lobe blank 1008 in this example is made by connecting a first section 1010 and a second section 1012. Each section 1010 and 1012 has a concave feature formed therein, which when the first section 1010 is connected to the second section 1012, forms a neck opening 1014 that surrounds the neck region 302 of the camshaft 100. Features aiding the alignment between the first section 1010 and second section 1012 include a protrusion 1016 formed in one section and corresponding to an opening 1018 in the other section, and a fastener opening 1020 configured to receive a fastener 1022 and arranged to secure the two sections 1010 and 1012 to each other. Similarly, a ledge or other features of the lobes described thus far may be used to align each or both of the first and second sections 1010 and 1012 to the neck region 302. Of course, even though one fastener is shown here connecting the first and second sections 1010 and 1012 to each other, it can be appreciated that more than one fasteners or more than one protrusions can be used to connect and align the various sections of a lobe blank to each other.

Figure 12:
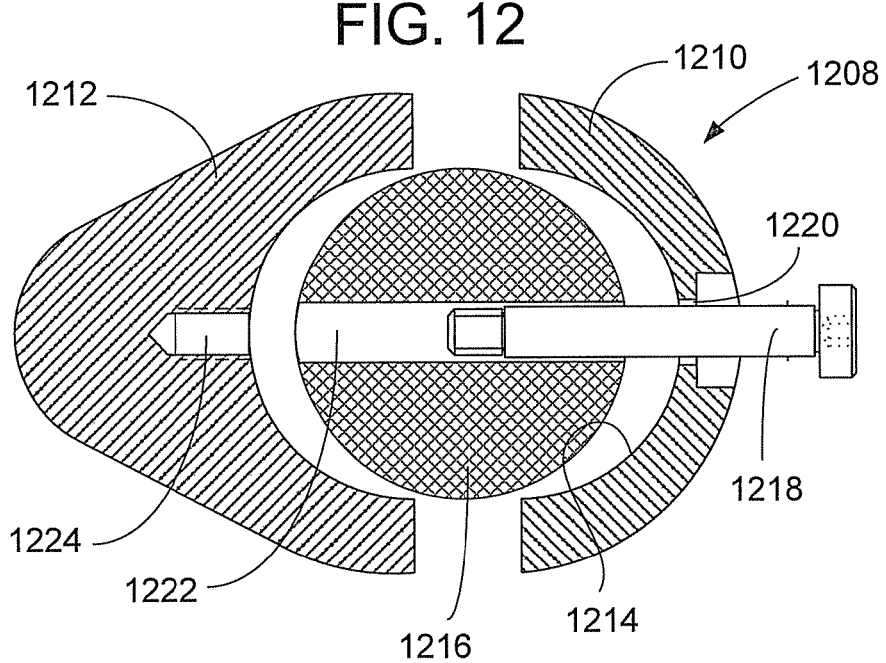

An alternate embodiment for a segmented lobe blank 1208 is shown in FIG. 12. In this embodiment, the segmented lobe blank 1208 includes a first portion 1210 and a second portion 1212. When connected, the first and second portions 1210 and 1212 form a symmetrical opening 1214 that surrounds a neck region 1216 of the camshaft. Alignment of the assembled segmented lobe blank 1208 with the neck region 1216 is accomplished by a fastener 1218 passing through the first portion 1210, the neck region 302, and the second portion 1212. In this case, the alignment feature is an opening that accepts the fastener 1218. The fastener 1218 passes through a first opening 1220 in the first portion 1210, a neck opening 1222 formed in the neck region 1216 and oriented along a diameter thereof corresponding to the desired orientation of the lobe, and a second opening 1224 formed in the second portion 1212 and having threads engaging the fastener 1218. Additional alignment features on the neck region 1216 and/or the segmented lobe blank 1208 may not be required for this embodiment because alignment may be accomplished by simply assembling the fastener 1218 by connecting the first and second portions 1210 and 1212 through the neck opening 1222.

Figure 13:
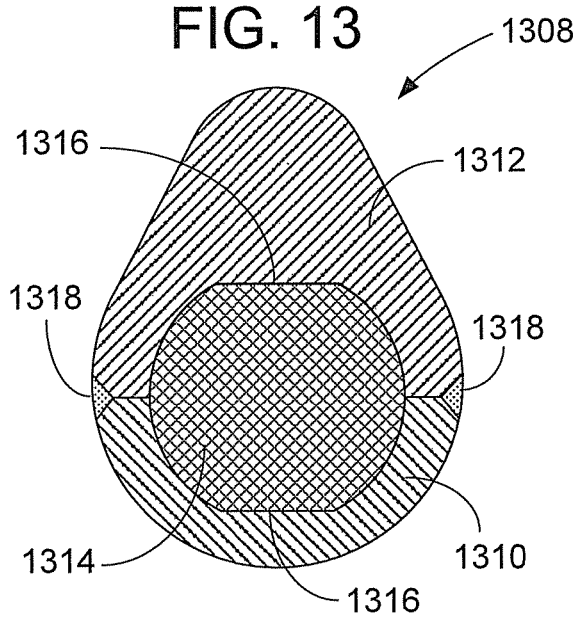

Even though fasteners have been illustrated thus far to connect the various segments or portions of the segmented lobe blanks, other methods or combination of methods can be used. For example, a segmented lobe blank 1308 including a first portion 1310 and a second portion 1312 is shown in FIG. 13. The segmented lobe blank 1308 is shown assembled around a neck region 1314 having two flat portions 1316 along the interface therebetween. The first portion 1310 and second portion 1312 are welded to each other along two weld beads 1318. Welding is a practical mode of connection between the first and second portions 1310 and 1312 inasmuch as any weld spatter or protrusion of weld material beyond the desired lobe profile may be ground or machined off when the segmented lobe blank 1308 is refined by machining its outer portion to the desired contour. Alternatively, welding or a plug may be used to secure the head of a fastener to the lobe blank to prevent loosening or "walking out" of the fastener during service. Further, weld material may be used to fill-in the opening around the head of the fastener. Optionally, one may even forego use of welding or fasteners in favor of adhesives, for example various epoxies, brazing, or soldering processes to connect the various portions of the lobe blanks to each other and even to the neck region of the camshaft.

Figure 14:
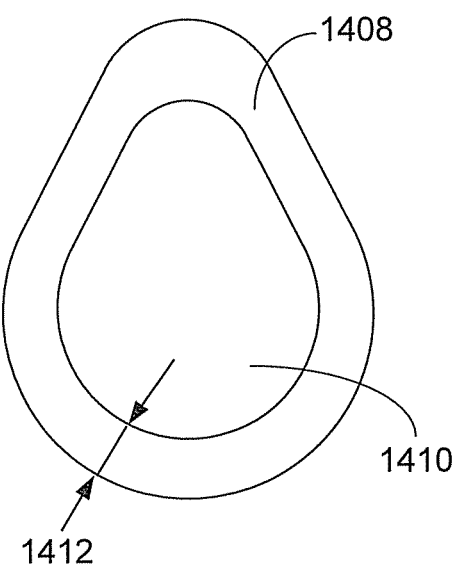
FIG. 14 is an alternate embodiment for a lobe blank having a lobe-shaped alignment feature in accordance with the disclosure.

The foregoing description relative to the neck region of the camshaft has included a grinding or machining process to entirely remove the defective lobe or, alternatively, a defective bearing portion, leaving a cylindrical neck section on the camshaft. A damaged lobe or bearing will typically have damage or wear along an outer portion or surface thereof. Therefore, the machining operation performed to remove the damaged or worn portions of the damaged lobe or bearing may advantageously be limited to the damaged or worn outer portion. Hence, the damaged lobe or bearing on a camshaft may undergo a limited machining to remove a layer of material from its outer portion, leaving a neck region having, respectively, a lobe-shaped or cylindrical profile. A lobe blank for such a situation would have a lobe-shaped neck opening. Such a lobe blank 1408 is shown in FIG. 14. The lobe blank 1408, shown as a single structure for illustration, has a neck opening 1410 which follows the external profile of the lobe blank 1408 such that a wall thickness 1412 is substantially uniform. As can be appreciated, the lobe blank 1408 may be segmented into two or more portions, or may even be formed by a strip of material that is bent and formed around the neck region of the camshaft being reconditioned.

INDUSTRIAL APPLICABILITY

The present disclosure is applicable to the remanufacturing of engine components among other applications. More particularly, the methods described herein are well suited for repairing, reconditioning, or refurbishing camshafts having worn or damaged lobes. Various features and aspects are described in conjunction with specific embodiments, but it can be appreciated that individual features may be combined in ways not illustrated depending on the specific application.

When a worn or damaged camshaft is returned to a remanufacturer's facility, it can be first inspected to determine the nature and extent of damage. Even though some damaged camshafts may be scrapped, some or a majority of them will have acceptable dimensional characteristics overall, but also wear or scuffing damage to one or more of their lobes or bearings. For such camshafts, a reconditioning or rebuilding process may be applied to yield dimensionally and operationally acceptable components for re-use in service.

After a camshaft having one or more defective lobes and/or bearings has been identified, a machining operation may be used to remove either a layer of material from the damaged feature or the damaged feature entirely, leaving a relatively smooth neck region for attachment of a replacement blank. The neck region may take on any shape that is appropriate for connecting with a lobe or bearing blank. For example, the neck region may be cylindrical, with or without flat portions formed thereon for alignment. In general, the neck region may be circular or non circular, such as hexagonal or square, in cross section. Various alignment features may be formed in the neck region, for example, flat portions, openings, and so forth, before a blank is installed and connected to the camshaft forming a rigid structure.

Installation of the blank may be accomplished by first segmenting the camshaft at an axial location along its centerline intersecting the neck region. The blank may then be installed around the neck region before re-assembling the camshaft portions. Alternatively, the blank may be segmented and installed in two or more pieces around the neck region formed in the camshaft. In this instance, segmentation of the camshaft may not be necessary. The two or more blank portions may then be connected to each other and/or to the camshaft to form a rigid structure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

All methods described herein can be performed in any suitable order unless otherwise indicated herein or otherwise clearly contradicted by context. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A refurbished camshaft, comprising:
a camshaft core having a centerline;
a neck region formed on the camshaft core at an axial location along the centerline, the neck region forming at least one alignment feature;
a blank forming a neck opening disposed around the neck region and oriented according to the at least one alignment feature;
the camshaft core including at least two separable portions that have been re-connected to each other via the blank to form a rigid structure.

2. The refurbished camshaft of claim 1, wherein the at least one alignment feature is at least one flat portion formed in the neck region, the flat portion cooperating with a ledge formed along the neck opening of the blank.

3. The refurbished camshaft of claim 2, further including an additional flat portion formed in the neck region and disposed diametrically opposite from the flat portion, the additional flat portion cooperating with an additional ledge formed along the neck opening of the blank.

4. The refurbished camshaft of claim 1, wherein the at least one alignment feature is a neck opening formed through the neck region, and wherein the refurbished camshaft further includes a fastener connecting the at least two portions of the blank to each other, the fastener passing through the neck opening.

5. The refurbished camshaft of claim 1, wherein the blank is at least one of a lobe blank and a bearing blank.

6. The refurbished camshaft of claim 1, wherein the neck region has at least one of a lobe shape and a cylindrical shape.

7. The refurbished camshaft of claim 1, wherein the at least two portions of the camshaft core are connected along an interface surface, the interface surface intersecting the centerline at an angle.

* * * * *